United States Patent Office 2,801,936
Patented Aug. 6, 1957

2,801,936

ACRYLIC RESINS BONDED TO POLYSTYRENE

Johan Bjorksten, Madison, Wis., Stuart O. Fiedler, Cleveland, Ohio, and Luther L. Yaeger, Madison, Wis., assignors to American Motors Corporation, a corporation of Maryland No Drawing. Application December 12, 1952,
Serial No. 325,726

8 Claims. (Cl. 117—138.8)

This application relates to acrylic resins and more particularly to such resins bonded to polystyrene.

Heretofore, synthetic resins applied to the surface of polystyrene articles have been found useful for providing polystyrene articles with improved surface characteristics such as improved abrasion resistance, improved optical properties, improved solvent resistance and the like. However, it has not been possible to secure sufficiently good bonds, that is sufficiently good adherency between such synthetic resins and polystyrene, and it has not been possible to provide such resins, and particularly acrylic resins, which could be applied to form a layer having the characteristics of a coating or laminate, which therefore would be integrally bonded to said polystyrene, and which could be removed at will on a commercially successful basis. This invention overcomes these disadvantages.

It is therefore an object of this invention to provide an acrylic resin or resins bonded to the surface of polystyrene by a bond at least as strong as the co-hesive bonds in the respective materials which can yet be removed discretely from the polystyrene at will by commercially successful processes. Another object is to accomplish this without use of pressure or elevated temperature. Further objects will become apparent as the following detailed description proceeds.

The present invention represents an improvement over previous superior coatings for polystyrene disclosed in U. S. Patents 2,578,665, 2,578,683 and 2,578,770 and also disclosed in co-pending applications Serial No. 23,392 filed April 26, 1948, entitled Chemical Composition and Method, Serial No. 4,945 filed January 28, 1948, entitled Surface Treatment of Plastic Products, Serial No. 221,117 filed April 14, 1951, entitled Surface Treated Plastic Materials, and Serial No. 262,474 filed December 19, 1951, entitled Coating Composition for Plastics.

This application is a continuation-in-part of said applications.

It has been found that in providing acrylic resin compositions adapted to provide acrylic resins adherent to the surface of polystyrene, it is highly desirable in commercial practice that the adhesivity for polystyrene be very great and be of such an order of magnitude that the forces of adhesivity in the bonding layers be greater than the forces of co-adhesivity in either the acrylic resin or the polystyrene. It has also been found to be highly desirable in commercial practice to remove such acrylic resins from such polystyrene in order to permit the reclaiming of molded polystyrene articles which have been found to be defective only after having been provided with a layer of acrylic resin on the surface thereof.

Applicants are the holders of several patents and patent applications relating to coatings for polystyrene. Compositions in accordance with the inventions represented by these patents and applications have been made and marketed commercially for some time and several problems have made themselves apparent in providing suitable coatings which satisfactorily fulfill all requirements of customers.

In particular, as disclosed in Patent 2,578,665, it is generally necessary to provide complex and delicately balanced solvent mixtures for polymers comprising ethylacrylate, methylacrylate, ethylmethacrylate, methylmethacrylate and co-polymers of these resins in order to provide satisfactorily adherent coatings for polystyrene.

It has been possible to provide on a commercial basis coatings comprising these polymers in balanced solvent mixtures prepared in accordance with disclosures of the applications of which this application is a continuation-in-part.

However, customers in certain cases desire to remove the coating after it has once been applied. This situation arises in the case of articles which are rejected as being poor moldings or for mechanical reasons and from which customers desire to reclaim the resin of which these articles have been made. However, as mentioned in Patent 2,578,665 and in the applications of which this application is a continuation-in-part, it is extremely difficult to remove polymers of ethyl and methyl esters of acrylic and methacrylic acids on polystyrene deposited from the solvent mixtures of these several inventions because the solvent resistance of the coating is high and the bond is extremely strong so that neither chemical nor mechanical methods suffice. Several such customers have complained and other potential customers have refused to buy simply because they could not remove layers of these polymers from polystyrene articles rejected on inspection after being coated, from which they desired to reclaim the polystyrene resin.

It has therefore been desirable to provide resin coating compositions which such customers can use on polystyrene to provide an extremely adherent and therefore highly satisfactory coating but yet which could be removed simply and easily by customers.

It may be thought that it might be possible for the customer to remove polymers of ethyl and methyl acrylate and ethyl and methyl methacrylate from polystyrene by the use of the same solvent compositions or at least the same type of solvent composition used to deposit such polymers on polystyrene but in practice this has not worked out simply because such mixtures must be complex and delicately balanced and it has not been found possible to provide customers with such complex and delicately balanced compositions, especially for use in dissolving a polymer off an article rather than for depositing such polymer on the article. For example, it has not been possible to provide any single complex solvent composition which would remove all coatings prepared with polymers of ethyl and methyl acrylate and ethyl and methyl methacrylate and therefore it has been considered to provide customers with a plurality of such compositions but this has not been found practicable because the technological knowledge required of employees of such customers has been found to be inadequate for choosing the right composition to remove any specific coating. Also, solvent compositions which have been found suitable for depositing such polymers have been found useless for removing the same polymer because the relative rates of evaporation of the members of the composition are such that the compositions do not function for the removal operation.

All such disadvantages have been overcome by providing coating compositions adapted to be applied to polystyrene and halogenated polystyrene which comprise esters of acrylic acid or methacrylic acid or both, halogenated or unhalogenated, which contain at least 3 carbon atoms in the alkyl radical. It is true of course that not all of such esters, the higher esters of acrylic and methacrylic acids or copolymers thereof, have been found suitable for every possible coating purpose by such customers since coatings prepared with polymers such as n-amyl methacrylate, n-hexyl methacrylate and even n-butylacrylate, and particularly lauryl methacrylate are very soft and even tacky, but coatings of this type may be utilized for adhesives and for trapping insects and a valuable application appears to be the use of such coatings for dust-removal devices. The use of such coatings in dust removal is of little commercial importance with respect to large scale plant size installation because of expense but may be highly adaptable to certain applications in connection with some scientific instruments, particularly those in connection with which it is undesirable to utilize an electrostatic field. The particularly great value of the esters containing more than 3 carbon atoms lies in the fact that the customer may easily remove all such coatings by means of any one of several simple solvents or extremely simple solvent mixtures and this is shown by Table 2 below. It may be observed from Table 2 that a very sharp dividing line exists between the esters containing only 1 or 2 carbon atoms on the one hand and the esters containing 3 or more carbon atoms on the other hand, all of the latter esters being soluble in such simple solvents and solvent compositions as are shown in Table 2 whereas the ethyl and methyl esters and their copolymers are not soluble in these compositions. It is thus made possible by this invention to provide customers with coatings having uniformly excellent adherence for polystyrene but which may vary in their surface properties to fit various needs of customers, and yet all of which can be removed by any one of several simple solvents or solvent compositions, the most suitable generally being a matter of choice based on the cost involved, which is of course a highly important factor, a salient critical factor to one engaged in manufacture and sale.

Adherence of a polymer to a polystyrene sample is determined by pressing firmly against the layer of polymer a strip of pressure-sensitive tape extending entirely across the surface of the sample. One end of this pressure-sensitive tape is then lifted substantially at right angles to the surface of the sample and visual observation is used to determine whether the coating is thereby removed from the polystyrene.

Adherence of the coating for polystyrene is also determined by a scratch test, in which a standard phonograph needle carried upon the end of a horizontally pivoted arm, is let down upon the coated surface of the sample approximately ½ inch from one edge and the sample is then slidably withdrawn from under the needle. A load of 1.5 lbs is maintained upon the needle. Non-adherency of the coating for polystyrene is observed by separation of the coating from the polystyrene face, adjacent the scratch thus produced and the test is recorded as negative if any separation whatsoever is observed.

It is shown quite well by Table 1, which shows various suitable coating compositions adapted to provide adherent coatings with polystyrene, comprising certain esters of halogenated and unhalogenated acrylic and methacrylic acids, that a wide variety of solvents and solvent mixtures may be used, in order to provide a coating composition adapted to not attack the surface of a polystyrene article:

*Table 1*

| Example | 1 | 2 | 3 | 4 | 5 | 6 | 7 | 8 | 9 | 10 |
|---|---|---|---|---|---|---|---|---|---|---|
| Monomer or Monomers from which Polymer formed | methyl acrylate | ethyl acrylate | n-propyl acrylate | iso-propyl acrylate | n-butyl acrylate | isobutyl acrylate | t-butyl acrylate | chloro-n-butyl acrylate | n-hexyl acrylate | dichloro cyclohexyl acrylate |
| Type of Application for which formulation is suitable | Spray | Spray | Dip | Spray | Spray | Spray or Dip | Spray | Spray | Spray | Spray |
| polymer | 10 | 20 | 15 | 15 | 7.1 | 10 | 10 | 10 | 10 | 10 |
| acetone | | | | 40 | 42.9 | | | 35.5 | 30 | |
| methylethyl ketone | 30 | 20 | 15 | | | | | | 20 | 40 |
| methylbutyl ketone | | | | | | | | | 30 | |
| methyl isobutyl ketone | 15 | | | | | | | | | |
| dipropyl ketone | | | | | | | | | | |
| dibutyl ketone | | | | | | | | 10 | | |
| cyclohexanone | | | | | | | | | | |
| methanol | 15 | | 15 | 20 | | | | | 10 | |
| ethanol | | 10 | | | 7.9 | | 20 | | | |
| n-propanol | | | | | | | | | | |
| isopropanol | | | | | | | | | | |
| n-butanol | | | | | | 20 | | | | |
| isobutanol | | | | | | | | | | |
| tertiary butanol | | | | | | | | | | |
| amyl alcohol | | | | | | | | 15.5 | 10 | |
| iso-amyl alcohol | | | | | | | | | | |
| hexanol | | | | | | | | | 20 | |
| methyl acetate | | | | | 10.0 | | | | 15 | |
| butyl acetate | | | | | | | | | | 15 |
| amyl acetate | | | | | | | | | | |
| methyl butyrate | | | | | | | | | | |
| methyl lactate | | | | | | | | 9 | | |
| ethyl lactate | | | | 10 | 6.4 | | | | | |
| butyl lactate | | | | 5 | | | | | | |
| amyl lactate | | | | | | | | | | |
| nitromethane | | | | | | | | | 10 | |
| nitroethane | | | | | | | | | | 5 |
| nitropropane | | | | | | | | | | |
| cyclohexane | | | | | | | | 5 | 5 | |
| n-heptane | | | | 5 | | | | | | |
| kerosene | | | | | | | | | | |
| naphtha | | | | | 4.3 | | | | | |
| n-hexane | | | | | | 60 | | | | 15 |
| benzene | | | | | | | | | 10 | |
| toluene | | | | | | | | | | |
| diacetone alcohol | 10 | 10 | | 15 | 7.1 | | | 10 | | 15 |
| ethylene glycol monomethyl ether | 20 | | 30 | | | | | 5 | | |
| ethylene glycol monethyl ether | | | 35 | 5 | | | | | | |
| ethylene glycol monobutyl ether | | | | 10 | 14.3 | | | | | |
| ethylene glycol monomethyl ether acetate | | 5 | | | | | | | | |
| ethylene glycol monethyl ether acetate | | | | | | | | | | |
| ethylene dichloride | | | | | | | | | | |
| chloroform | | | | | | | | | | |

Table I.—Continued

| Example | 11 | 12 | 13 | 14 | 15 | 16 | 17 | 18 | 19 |
|---|---|---|---|---|---|---|---|---|---|
| Monomer or Monomers from which Polymer formed | n-octyl acrylate | 2-ethyl hexyl acrylate | cyclohexyl acrylate | methyl methacrylate | ethyl methacrylate | n-propyl methacrylate | isopropyl methacrylate | n-butyl methacrylate | isobutyl methacrylate |
| Type of Application for which formulation is suitable | Spray | Dip | Spray | Spray | Spray | Dip | Spray | Spray | Spray |
| polymer | 15 | 12 | 10 | 10 | 25 | 9 | 8 | 10 | 8.3 |
| acetone | 30 | 15 | 10 | 20 | | | 30 | | 25.0 |
| methylethyl ketone | | | | | | 25 | | | |
| methylbutyl ketone | | 5 | | | | | | | |
| methyl isobutyl ketone | | | | | | 10 | | | |
| dipropyl ketone | | | | | | | | | |
| dibutyl ketone | | | | | | | | | |
| cyclohexanone | | | | | | | | | |
| methanol | | 3 | 20 | | | | | | |
| ethanol | | 8 | | 11 | 25 | | 10 | | |
| n-propanol | | | | | | | 20 | | 17.5 |
| isopropanol | | | | | | 20 | | | |
| n-butanol | | 10 | 20 | | | 30 | | 20 | |
| isobutanol | | 22 | | | | | | | |
| tertiary butanol | 15 | 10 | | | | | | | |
| amyl alcohol | 20 | | | | | | | | |
| iso-amyl alcohol | | | | | | | | | |
| hexanol | | | | | | | | | |
| methyl acetate | | | | 14 | | | | | 10.0 |
| butyl acetate | | | | | | 10 | | | |
| amyl acetate | | | | | | | | | |
| methyl butyrate | | | | | | | | | |
| methyl lactate | | | | | | | | | |
| ethyl lactate | | | | 9 | | | | | 7.5 |
| butyl lactate | | | | | | | | | |
| amyl lactate | | | | | | | 2 | | 3.3 |
| nitromethane | | | | | | | | | |
| nitroethane | | | | | | | | | |
| nitropropane | | | | | | | 3 | | 4.2 |
| cyclohexane | | | | | | | | | |
| n-heptane | | 20 | | | | | | | |
| kerosene | | | | | | | | | 3.3 |
| naphtha | 15 | | 10 | | | | | 10 | |
| n-hexane | | | 30 | | | | | 60 | |
| benzene | | | | | | | 15 | | |
| toluene | | | | | | | | | 4.2 |
| diacetone alcohol | | | | 6 | 25 | 8 | 6 | | |
| ethylene glycol monomethyl ether | | | | 30 | | | | | 16.7 |
| ethylene glycol monoethyl ether | | | | | | | | | |
| ethylene glycol monobutyl ether | | | | | | | | | |
| ethylene glycol monomethyl ether acetate | | | | | | 10 | 4 | | |
| ethylene glycol monoethyl ether acetate | | | | | | 3 | 2 | | |
| ethylene dichloride | | | | | | | | | |
| chloroform | | | | | | | | | |

| Example | 20 | 21 | 22 | 23 | 24 | 25 | 26 | 27 |
|---|---|---|---|---|---|---|---|---|
| Monomer or Monomers from which Polymer formed | t-butyl methacrylate | di-chlorobutyl methacrylate | iso-amyl methacrylate | n-hexyl methacrylate | cyclo-hexyl methacrylate | n-octyl methacrylate | 2-ethylhexyl methacrylate | lauryl methacrylate |
| Type of Application for which formulation is suitable | Spray | Spray | Dip | Spray | Dip | Spray | Spray | Spray |
| polymer | 11 | 11 | 10 | 18 | 10 | 10 | 4 | 10 |
| acetone | 29 | 15 | | | | 20 | | |
| methylethyl ketone | | 15 | | | | | 20 | 10 |
| methylbutyl ketone | | | | | | | | |
| methyl isobutyl ketone | | | | | | | | |
| dipropyl ketone | 15 | 5 | | | | | | |
| dibutyl ketone | | | | | | 10 | | 10 |
| cyclohexanone | | | | | 10 | | | |
| methanol | | | | | | 20 | 10 | |
| ethanol | | | | 30 | | 20 | | 10 |
| n-propanol | 10 | | | | 20 | | | |
| isopropanol | | | | | | | 20 | |
| n-butanol | | | | 30 | | 20 | 30 | |
| isobutanol | | | | | | | | 10 |
| tertiary butanol | | | | | | | | |
| amyl alcohol | 15 | | 30 | 22 | | | 10 | 10 |
| iso-amyl alcohol | 5 | | | | | | | |
| hexanol | | | | | | | | |
| methyl acetate | | 12 | | | | | | |
| butyl acetate | | | | | | | 6 | |
| amyl acetate | | | | | | | | |
| methyl butyrate | | | | | | | | |
| methyl lactate | 5 | | | | | | | |
| ethyl lactate | | | | | | | | |
| butyl lactate | | | | | | | | |
| amyl lactate | | | | | | | | |
| nitromethane | | | | | | | | |
| nitroethane | 5 | | | | | | | |
| nitropropane | | | | | | | | |
| cyclohexane | | | | | | | | |
| n-heptane | | | | | | | | |
| kerosene | | | | | | | | 20 |
| naphtha | | | | | | | | 10 |
| n-hexane | | | | | | 20 | 10 | 10 |
| benzene | | | | | | | 30 | |
| toluene | 5 | 6 | | | | | | |

Table I.—Continued

| Example | 20 | 21 | 22 | 23 | 24 | 25 | 26 | 27 |
|---|---|---|---|---|---|---|---|---|
| Monomer or Monomers from which Polymer formed | t-butyl methacrylate | di-chloro-butyl methacrylate | iso-amyl methacrylate | n-hexyl methacrylate | cyclo-hexyl methacrylate | n-octyl methacrylate | 2-ethyl-hexyl methacrylate | lauryl methacrylate |
| Type of Application for which formulation is suitable | Spray | Spray | Dip | Spray | Dip | Spray | Spray | Spray |
| diacetone alcohol | | | 16 | | 20 | | | |
| ethylene glycol monomethyl ether | | | 20 | | | | | |
| ethylene glycol monoethyl ether | | | | | | | | |
| ethylene glycol monobutyl ether | | | | | | | | |
| ethylene glycol monomethyl ether acetate | | | | | | | | |
| ethylene glycol monoethyl ether acetate | | | | | | | | |
| ethylene dichloride | | | | | 20 | | | |
| chloroform | | | | | 20 | | | |

| Example | 28 | 29 | 30 | 31 | 32 | 33 |
|---|---|---|---|---|---|---|
| Monomer or Monomers from which Polymer formed | methyl acrylate and ethyl acrylate | methyl methacrylate and methyl acrylate | n-butyl methacrylate cyclohexyl methacrylate | n-hexyl methacrylate and iso-octyl acrylate | isobutyl acrylate and butyl methacrylate | n-butyl acrylate n-butyl methacrylate and cyclohexyl methacrylate |
| Type of Application for which formulation is suitable | Spray | Spray | Dip | Spray | Spray | Spray |
| polymer | 10 | 10 | 14 | 3 | 5 | 8 |
| acetone | 10 | 20 | | 20 | 55 | |
| methylethyl ketone | 18 | 10 | | 22 | | 40 |
| methylbutyl ketone | | | | | | |
| methyl isobutyl ketone | 10 | 10 | | | | |
| dipropyl ketone | | | | 5 | | |
| dibutyl ketone | | | | | 10 | |
| cyclohexanone | | | 6 | | | |
| methanol | 10 | | | 20 | | 20 |
| ethanol | | 10 | | | | |
| n-propanol | | | 21 | | | |
| isopropanol | | | 10 | | 20 | 30 |
| n-butanol | | | | | 10 | |
| isobutanol | | | | | | |
| tertiary butanol | | | | | | |
| amyl alcohol | 8 | | | | | |
| iso-amyl alcohol | | | 10 | | | |
| hexanol | | 8 | | | | |
| methyl acetate | | | | | | |
| butyl acetate | | | | | | |
| amyl acetate | | | | | | |
| methyl butyrate | | | | | | |
| methyl lactate | | | | | | |
| ethyl lactate | | | 10 | | | |
| butyl lactate | | | 2 | | | |
| amyl lactate | | | | | | |
| nitromethane | | | | | | |
| nitroethane | | | 15 | | | |
| nitropropane | | | | | | |
| cyclohexane | | | | | | |
| n-heptane | | | | | | |
| kerosene | | | | | | |
| naphtha | | | | | | |
| n-hexane | | | | | | 2 |
| benzene | | | | | | |
| toluene | | | | 12 | 20 | |
| diacetone alcohol | 20 | 20 | | | | |
| ethylene glycol monomethyl ether | 4 | | | | | |
| ethylene glycol monoethyl ether | | 12 | | | | |
| ethylene glycol monobutyl ether | | | | | | |
| ethylene glycol monomethyl ether acetate | | | | | | |
| ethylene glycol monoethyl ether acetate | 10 | | | 10 | | |
| ethylene dichloride | | | | | | |
| chloroform | | | | | | |

Such attack is represented by dissolving of the polystyrene surface and by swelling of the polystyrene at and adjacent to this surface. It is also represented by blushing of the polystyrene and it is probably most often represented, especially in polystyrene containing internal strains of especially great magnitude, by crazing and even cracking of the polystyrene surface. Such coating compositions are adapted to deposit on the surface of the polystyrene a coating consisting entirely of the acrylate or methacrylate or copolymer by virtue of the volatility characteristics of the solvent mixture and by virtue of the simultaneous properties of adhesivity of the acrylate or methacrylate or copolymer for polystyrene surfaces which is apparent only in the presence of a solvent liquid of the type described.

Heretofore it has been attempted to set forth in Markush form or in generic form or otherwise in some other systematic form by chemical classification, the groupings and their proportions according to which a suitable solvent mixture may be provided.

Subsequently it has been found that numerous additional solvent compositions other than those falling within the described grouping are highly suitable and this is especially true for the esters containing more than 3 carbon atoms. It has not been possible to establish any chemical grouping or classification in terms of chemical nomenclature to describe such solvent mixture and if it were possible it has become quite evident by now that any such description would be in the nature of a phase diagram, except that instead of the conventional 3 phases represented in the well known triangular nomograph, perhaps somewhere between 12 and 33 phases would have to be represented. It is apparent that this is quite beyond the scope of present day science to diagrammatically describe and it is further more apparent that in order to determine all the boundary lines and boundary surfaces for such a diagram a research program of several thousands or even tens of thousands of man hours would have to be instituted. It is believed similarly obvious to even the uninitiate that the situation could not possibly justify such a research program.

Table 2 which shows results obtainable with 4-inch by 4-inch by quarter-inch samples of injection molded polystyrene coated with each of the compositions shown in Table 1, concisely shows the inapplicability of the methyl and the ethyl esters of acrylic and methacrylic acid for the present invention due to their insolubility in simple solvent compositions such as 20% acetone and 80% methanol, shown there, coupled with the corresponding solubility of every one of both the halogenated and unhalogenated esters of acrylic and methacrylic acids containing more than 3 carbon atoms:

Table 2

| Example | Solubility (Completely Miscible in All Proportions) | | | Adherence to Polystyrene | |
|---|---|---|---|---|---|
| | A | B | C | Scratch Test | Pressure Sensitive Tape Test |
| 1 | no | no | no | Adherent | Adherent. |
| 2 | no | no | no | do | Do. |
| 3 | yes | yes | yes | do | Do. |
| 4 | yes | yes | yes | do | Do. |
| 5 | yes | yes | yes | do | Do. |
| 6 | yes | yes | yes | do | Do. |
| 7 | yes | yes | yes | do | Do. |
| 8 | yes | yes | yes | do | Do. |
| 9 | yes | yes | yes | do | Do. |
| 10 | yes | yes | yes | do | Do. |
| 11 | yes | yes | yes | do | Do. |
| 12 | yes | yes | yes | do | Do. |
| 13 | yes | yes | yes | do | Do. |
| 14 | no | no | no | do | Do. |
| 15 | no | no | no | do | Do. |
| 16 | yes | yes | yes | do | Do. |
| 17 | yes | yes | yes | do | Do. |
| 18 | yes | yes | yes | do | Do. |
| 19 | yes | yes | yes | do | Do. |
| 20 | yes | yes | yes | do | Do. |
| 21 | yes | yes | yes | do | Do. |
| 22 | yes | yes | yes | do | Do. |
| 23 | yes | yes | yes | do | Do. |
| 24 | yes | yes | yes | do | Do. |
| 25 | yes | yes | yes | do | Do. |
| 26 | yes | yes | yes | do | Do. |
| 27 | yes | yes | yes | do | Do. |
| 28 | no | no | no | do | Do. |
| 29 | no | no | no | do | Do. |
| 30 | yes | yes | yes | do | Do. |
| 31 | yes | yes | yes | do | Do. |
| 32 | yes | yes | yes | do | Do. |
| 33 | yes | yes | yes | do | Do. |

A—Ethylene glycol monomethyl ether.
B—20% acetone, 80% methanol.
C—90% n-butanol+10% methyl ethyl ketone.

It is shown also by Table 2 that the adhesivity or adherency of all such esters is generally at least excellent but it must be remembered that these results are conditioned upon the esters being dissolved in a solvent composition according to the invention and that such results cannot be obtained with solvents of the usual type disclosed in the prior art such as 100% ethanol or 100% acetone.

From the above description and the data shown in Tables 1 and 2 it may thus be seen and should be clearly understood that the invention relates to causing a layer of acrylic synthetic resin to adhere to at least one surface of a polymer formed from at least one monomer having the chemical formula

wherein X is —H, —Cl or —Br and wherein φ represents phenyl which may be halogenated. Such polymer may be copolymerized with other materials particularly such as butadiene and acrylonitrile, copolymers of this sort being only those which comprise at least some proportion of the polymer according to said formula.

It should also be apparent and should be understood that said acrylic synthetic resin is a polymer formed from at least one monomer having the following chemical formula:

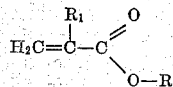

wherein $R_1$ is —H or —$CH_3$ and R is a saturated aliphatic radical, which may be halogenated, containing at least 3 carbon atoms and that every monomer included within the scope of this definition is included within the invention and is operable for the invention so far as it has been possible to determine within the reasonable scope of chemical research. Differences have been observed between the acrylate monomers and methacrylate polymers, that is, differences have been observed between those compounds wherein $R_1$ is —H and those compounds wherein $R_1$ is —$CH_3$, but such differences have not been observed to have applicability to the present invention. It has been particularly determined by careful research that polymers of the ethyl and methyl esters of halogenated and unhalogenated acrylic and methacrylic acids are not operable for the invention as is clearly shown by the above disclosure, and it is thus not possible to consider them equivalents of the compounds included within said definition.

It may of course be possible to include other materials, particularly other polymers such as those which undergo vinyl polymerization, including vinylcarboxylates such as vinyl acetate, vinyl butyrate and the like, styrenes and halogenated styrene, ethylene, fluorinated or chlorinated ethylene, acrylonitrile, butadiene and the like in a coating composition and thus obtain suitable coating compositions for polystyrene. It may also be feasible to include in the composition polyfunctional compounds or compounds containing non-conjugated ethylenic groups which serve as cross-linkers but generally speaking it has been found preferable to limit the coating compositions according to this invention to those falling within the above definition.

Although the scope of the polymeric ingredient in the coating compositions according to the invention has been carefully set forth above and the nature of the solvent which is necessary for the coating composition of the invention has been set forth above, it may be further mentioned that the coating compositions according to the invention include a polymeric component and a non-polymeric solvent component and it has been found critically necessary that they include both of said components and that each of said components fall within the above mentioned definitions. It has furthermore been found preferable that the solvent compositions according to the invention not include any other substance such as, particularly, a plasticizer.

It should be particularly pointed out that the solvent compositions of the invention and the coatings applied to polystyrene and its homologues according to the invention are prepared without incurring the disadvantages of causing the coating to undergo either a heating step or a pressing step. That is, a slick, smooth, optically suitable coating is applied, utilizing a composition which neither balls up, chips, sags, runs nor does any of the other myriad of things that inferior coating compositions have a tendency to do and this result is accomplished without at any time having to press the coated article between glass or metal platens in a press, without having to subject the coated article to any curing step which may require an oven, and in general without incurring any steps other than the application of the coating and the subsequent air drying of the coating.

This is a remarkable result as most methods of the prior art have required application of either heat or pressure and usually have required the application of both in order to obtain suitable coatings. The difference from a technological point of view is highly significant; it may best be measured by the respective costs which are not even remotely comparable.

Despite the fact that it is not necessary, according to the process of this invention, to subject the coated article to heat in order to provide the coating of the invention, the coated article may be subjected to curing temperatures, if the user desires to do this, without stepping outside the scope of the invention since in some circumstances such heating, though not necessary, may accelerate the air-drying step or may in some other manner suit better the needs of the user and such heating in no way destroys or makes less effective the coating of the invention so long of course as the heating is restricted to temperatures below the softening point of either of the above defined polymers.

It may thus be seen that the invention is broad in scope and should not be limited excepting by the claims.

Having thus disclosed our invention, we claim:

1. An article comprising polymerized styrene having adherent thereto a layer of a polymer formed from at least one monomer having the following chemical formula:

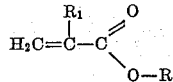

wherein $R_1$ is selected from the group consisting of —H and —$CH_3$ and R is a radical selected from the group consisting of saturated aliphatic radicals and halides thereof which contain at least three carbon atoms.

2. The article of claim 1 wherein R is —$C_3H_7$.
3. The article of claim 1 wherein R is —$C_4H_9$.
4. The article of claim 1 wherein R is —$C_5H_{11}$.
5. The article of claim 1 wherein R is —$C_6H_{11}$.
6. The article of claim 1 wherein R contains eight carbon atoms.
7. An article comprising a polymer formed from a monomeric material comprising styrene provided on at least part of a surface thereof with an adherent layer of a polymer formed from at least one monomer having the following chemical formula:

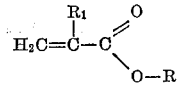

wherein $R_1$ is selected from the group consisting of —H and —$CH_3$ and R is a radical selected from the group consisting of saturated aliphatic radicals and halides thereof which contain at least three carbon atoms.

8. The article of claim 7 wherein $R_1$ is —H.

References Cited in the file of this patent

UNITED STATES PATENTS

| | | |
|---|---|---|
| 2,238,694 | Graves | Apr. 15, 1941 |
| 2,292,393 | Mitchell | Aug. 11, 1942 |
| 2,407,668 | Leatherman | Sept. 17, 1948 |

OTHER REFERENCES

Ind. and Eng. Chem., (1) article by Strain et al., pages 382–387, vol. 31, No. 4, April 1939.

Ind. and Eng. Chem., (2) article by Reinhart et al., pages 1522–1529, vol. 31, No. 12, December 1939.